United States Patent [19]

Scherer et al.

[11] Patent Number: 5,664,933

[45] Date of Patent: Sep. 9, 1997

[54] METHOD AND APPARATUS FOR TRANSFERRING A LOAD

[75] Inventors: Philip G. Scherer, Ft. Lauderdale; Werner K. Diehl, Parkland, both of Fla.

[73] Assignee: Mima Incorporated, Glenview, Ill.

[21] Appl. No.: 621,906

[22] Filed: Mar. 26, 1996

[51] Int. Cl.⁶ .................. B60G 9/02; B60P 1/16
[52] U.S. Cl. ............... 414/743; 280/111; 414/728; 414/778; 414/786
[58] Field of Search ................. 280/109, 111, 280/113; 298/17 B, 17 S, 22 R; 414/728, 743, 786, 778, 21

[56] References Cited

U.S. PATENT DOCUMENTS

| | | | |
|---|---|---|---|
| 2,828,031 | 3/1958 | Babcock et al. | 414/728 |
| 3,154,164 | 10/1964 | Shaw et al. | 280/111 X |
| 3,193,113 | 7/1965 | Kerr | 414/743 |
| 3,503,528 | 3/1970 | Martelee | 414/754 |
| 4,175,763 | 11/1979 | Conner, Jr. | 280/111 X |
| 4,641,484 | 2/1987 | Popelka | 53/399 |
| 5,125,210 | 6/1992 | Lang et al. | 53/399 |
| 5,308,217 | 5/1994 | Pienta | 414/21 X |
| 5,480,277 | 1/1996 | Minz | 414/778 |

FOREIGN PATENT DOCUMENTS 0294820  12/1988  European Pat. Off. .

Primary Examiner—Karen B. Merritt
Assistant Examiner—Janice L. Krizek
Attorney, Agent, or Firm—Schwartz & Weinrieb

[57] ABSTRACT

A method and apparatus for transferring a load to and from a load supporting platform having a first end pivotally coupled at a first end of a main frame having a support surface for supporting the platform in a substantially level position. The platform is pivotally raisable, from the support surface of the main frame to a raised position for discharging and accepting a load, either manually or by an actuatable member. A damping member interconnects the platform and the main frame wherein the damping member progressively increases resistance on the load bearing platform as the platform moves from the raised position toward the support surface of the main frame to reduce any impact on the load. The platform includes a lower frame and a cover biased away from the lower frame by a plurality of spring members wherein the cover is movable toward the lower frame by a load disposed on a support surface of the cover to actuate a load sensor, which indicates the presence of the load. A first pair of motor driven wheels is coupled to the first end of the main frame to drive the apparatus along an operating surface, and a second pair of wheels is coupled to opposite sides of a pivoting member to compensate for unevenness in the operating surface.

18 Claims, 3 Drawing Sheets

METHOD AND APPARATUS FOR TRANSFERRING A LOAD

FIELD ON THE INVENTION

The present invention generally relates to a method and apparatus for transferring a load to and from a load supporting platform pivotally coupled to a main frame, and more particularly to a method and apparatus for transferring bales from a baling machine onto a platform pivotally coupled to a main frame, where in the apparatus is also translatable to move the bale away from the baling machine to another station.

BACKGROUND OF THE INVENTION

Translatable platforms like dollies and conveyors for transferring articles have numerous applications including loading dock and assembly line operations. In the baling industry for example natural and synthetic materials like polyester fibre are formed into a bale by a baling machine and transferred or doffed onto a conveyor for further processing or shipment. In the past it has been common to transfer articles, generally referred to as a load, onto a rigid platform of a conveyor or dolly, which may include an arrangement of parallel rollers on a load supporting surface to facilitate transferring the load to and from the platform. It is known in the baling industry for example to transfer the load onto an initially inclined platform, which is later lowered toward a level surface without restraint, to transfer the load. In this transfer process, however, the load is subject to an initial impact against the inclined platform and to a second impact when the inclined platform is lowered without restraint onto the level surface. Damage to bales in the fibre baling industry is usually not of great concern because the transferred bale is first wrapped in overlapping plastic bags and secured by strapping, which prevents spillage and contamination of bale material during bale transfer onto the rigid platform. In other applications however it is not possible or is at least undesirable to transfer the load without restraint directly onto a rigid platform, which may result in damage or spillage of the load. In the automated baling system disclosed in copending U.S. patent application Ser. No. 08/639,202 filed on Apr. 26, 1996 and entitled "Method and System for Wrapping a Bale" for example, a naked bale is secured by strapping in the baling machine and is doffed onto a platform before being wrapped by plastic. The naked bales however have a tendency to spill bale material when doffed onto the rigid platforms of the prior art. Bale spillage is a serious problem resulting in waste bale material, which accumulates in the bale transfer environment where it can foul machinery and contaminate other bales. Other industries have similar load transferring constraints, which prohibit the use of existing load transferring technology.

In view of the discussion above, there exists a demonstrated need for an advancement in the art of transferring a load, onto a load supporting platform.

OBJECTS OF THE INVENTION

It is therefore an object of the invention to provide a novel method and apparatus for transferring a load that overcomes the problems of the prior art.

It is also an object of the invention to provide a novel method and apparatus for transferring a load that is economical to practice and produce, respectively.

It is another object of the invention to provide a novel method and apparatus for transferring a load onto an inclined or raised platform and increasingly damping the motion of the platform as the platform moves from an inclined position toward a substantially level support surface to reduce any impact on the transferred load.

It is a further object of the invention to provide a novel method and apparatus for transferring a load onto an inclined platform which is also translatable along an operating surface usable to move the load from one station to another.

SUMMARY OF THE INVENTION

Accordingly, the present invention is drawn to a method and apparatus for transferring a load to and from a load supporting platform having a first end pivotally coupled at a first end of a main frame with a support surface for supporting the platform in a substantially level position. The platform is raisable from the support surface of the main frame to a raised position either manually or by an actuatable member interconnecting the platform and the main frame. A damping member interconnects the platform and the main frame and increasingly dampens the motion of the load bearing raised platform as the platform is moved from the raised position toward the support surface of the mainframe to reduce any impact on the load. In the exemplary embodiment, the actuatable member is an air cylinder and the damping member is a hydraulic cylinder, and in an alternative embodiment the function of the damping member and the actuatable member may be integrated into a single cylinder. In one embodiment, the platform includes a lower frame and a cover biased away from the lower frame by a plurality of spring members wherein the cover is movable toward the lower frame by a load disposed on a support surface of the cover to actuate a load sensor, which indicates the presence of the load. In another embodiment, a first pair of motor driven wheels is coupled to the first end of the main frame to drive the apparatus along an operating surface. A second pair of wheels is coupled to opposite sides of a lateral member that is pivotally coupled to a second end of the main frame. The lateral member pivots relative to the main frame to compensate for unevenness in the operating surface to ensure simultaneous contact of all wheels on the operating surface, which distributes the weight of the load on the apparatus.

BRIEF DESCRIPTION OF THE DRAWINGS

These and outer objects, features and advantages of the present invention will become more fully apparent upon consideration of the following Detailed Description of the Invention with the accompanying drawings in which like structure and steps are referenced by corresponding numerals and indicators, throughout the several views, and wherein.

DETAILED DESCRIPTION OF THE INVENTION

Figure 1:
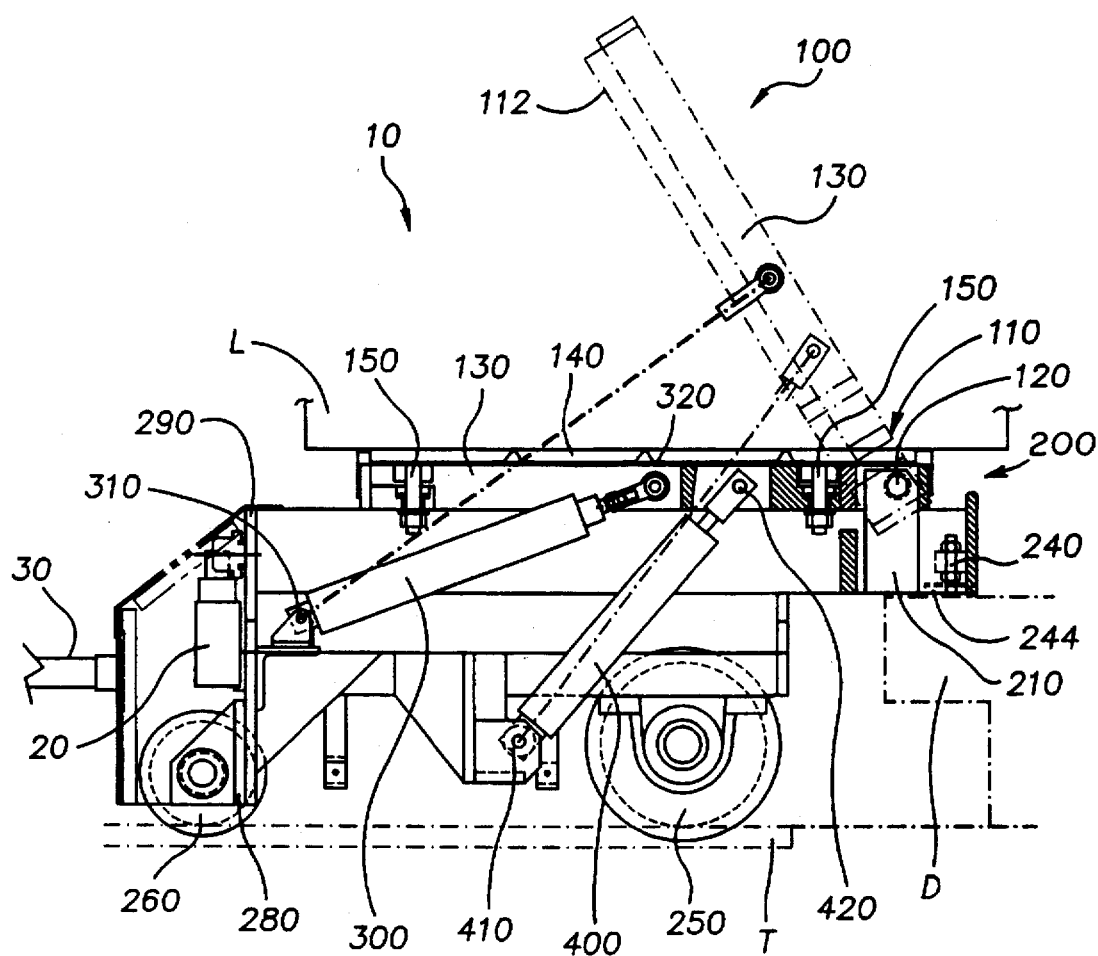
FIG. 1 is a partial sectional side view of an apparatus according to an exemplary embodiment of the invention taken along line 1—1 of FIG. 2.
Figure 2:
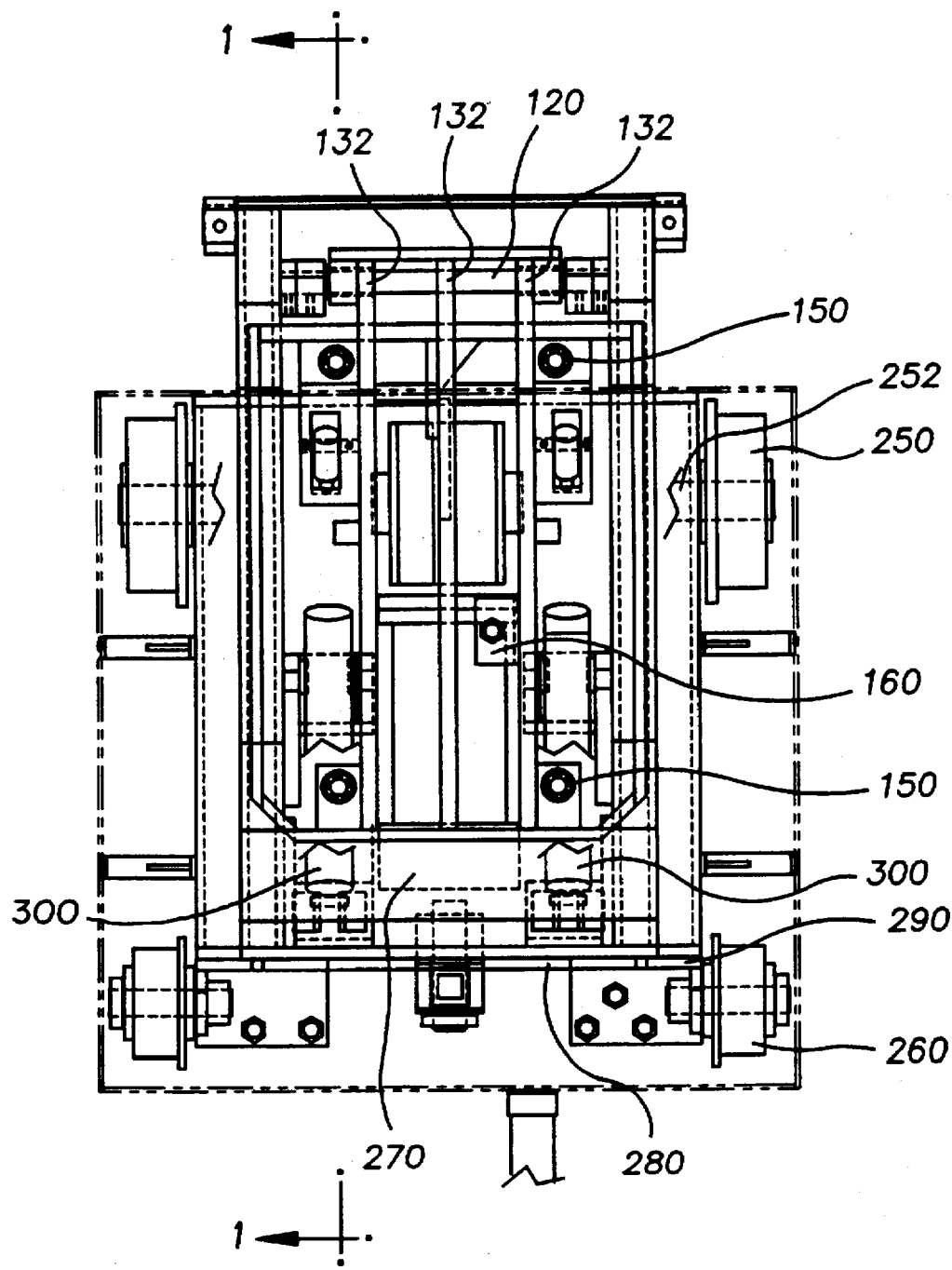
FIG. 2 is a partial plan view of an exemplary embodiment of the invention.

FIG. 1 is a partial sectional side view of an apparatus 10 according to an exemplary embodiment of the invention taken along line 1—1 of FIG. 2, which is usable for transferring a load L from some source like a baling machine, not shown in the drawing, onto a load support surface of the apparatus. The apparatus generally comprises a load supporting platform 100 with a first end portion 110 that is pivotally coupled at a first end portion of a main frame 200 by a fastening member like a pin 120. The main frame 200 according to the exemplary embodiment forms part of a translatable dolly but may alternatively form part of a stationary system with a conveyor onto which the load is transferred as discussed below. The main frame 200 generally includes a support surface for supporting the platform 100 in a lowermost position, and in the exemplary embodiment the support surface includes members 220 for supporting opposite side portions of the platform 100.

Figure 4:
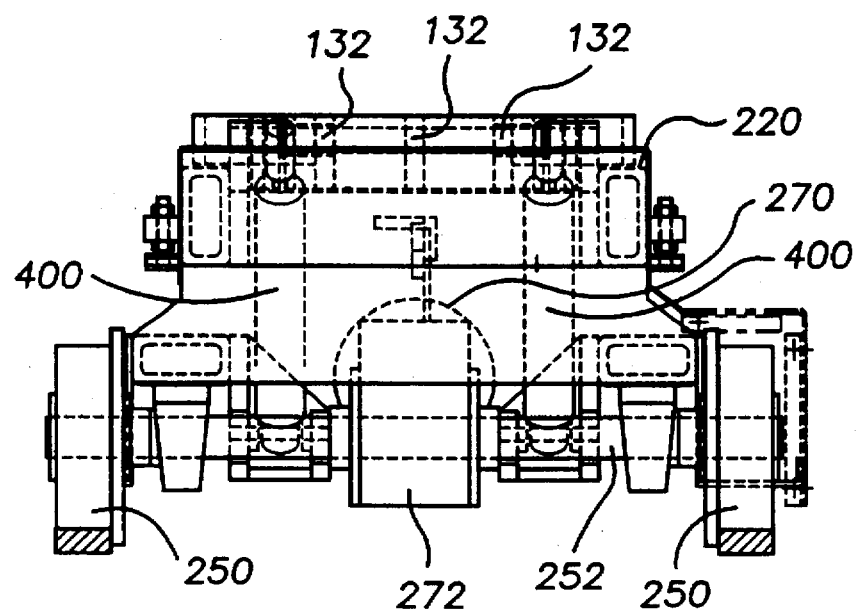
FIG. 4 is a partial rear view of the exemplary embodiment of the invention as viewed from the right side of FIG. 1.

The platform 100 is pivotally raisable from the support surface of the main frame 200 to a raised position either manually or by an actuatable member. In one embodiment the actuatable member is a first actuatable cylinder 300 with a first end 310 coupled to the main frame 200 and a second opposite end 320 coupled to the platform 100. The first actuatable cylinder 300 is extendable to pivotally raise the platform 100 from the support surface of the main frame 200 to the raised position shown by phantom lines in FIG. 1. The raised platform 100 is usable for accepting a load onto the platform 100, and for discharging a load from the platform 100. A first damping member interconnects the platform 100 to the main frame 200 to dampen motion of the platform 100 as the platform 100 moves from the raised position toward the support surface of the main frame by providing a progressively increasing resistance to the platform 100 as the platform 100 is lowered from the raised position toward the main frame 200. In one embodiment, the first damping member is a damping cylinder 400 with a first end 410 coupled to the main frame 200 and a second opposite end 420 coupled to the platform 100. The first actuatable cylinder 300 of FIG. 1 is coupled to the platform 100 farther away from the pivot pin 120 than is the first damping cylinder 400 to provide increased platform raising leverage. In alternative embodiments however the damping cylinder 400 may be coupled to the platform 100 farthest away from the fastening member 120. FIGS. 2 and 4 illustrate a pair of actuatable cylinders 300 and a pair of damping cylinders 400, which are symmetrically arranged to distribute the raising and lowering forces on the platform 100, respectively.

In the exemplary embodiment the actuatable cylinder 300 is an air cylinder that is extendable to raise the platform 100 supplying compressed air from an air supply to the air cylinder 300. A solenoid actuated air valve is coupled to the frame 200 for supplying air to the air cylinder 300 and for purging air from the air cylinder 300. Solenoid actuated air valves of this type are available from MAC Valves Inc., Wixom, Mich. Air may be supplied to the air valve through an air hose that is part of an umbilical cord 30, which is coupled to an adaptor 40 on the main frame 200. The umbilical cord 30 may for example be a nylon link chain which houses the air hose and other cables including control and electrical supply lines. In alternative embodiments, the actuatable member is a hydraulic cylinder, or other mechanically actuatable means like a winch. In the exemplary embodiment, the damping cylinder 400 is a hydraulic cylinder that provides a progressively increasing resistance as the ram is driven into the cylinder. Damping cylinders of this type are available from Enidine Inc., Orchard Park, N.Y., Model No. DA-50X8. In an alternative embodiment, the function of first actuatable cylinder 300 and the function of the first damping cylinder 400 are combined in a single cylinder for moving the platform 100 from the support surface of the main frame 200 to the raised position and for increasing the resistance to the platform 100 as the platform 100 moves from the raised position toward the support surface of the main frame 200.

In one mode of operation, the platform 100 is moved to the raised position either manually or by the actuatable member. In the exemplary embodiment the air cylinder 300 is actuatable by air supplied from the air valve to raise the platform 100 for discharging a load or positioning the platform 100 to receive a load. As the platform 100 is raised, the damping member, which in the exemplary embodiment is a hydraulic cylinder 400, is passively extended and does not offer any substantive assistance or resistance to the raising of the platform 100. The actuatable member 300 therefore applies all of the platform raising force. After the platform 100 is raised, the actuatable member 300 is isolated from the system to permit lowering of the platform 100 toward the support surface of the main frame 200 under control of the damping member 400 without interference from the actuatable member 300. In the exemplary embodiment, air is purged from the air cylinder 300 to permit contraction of the air cylinder 300 while the load bearing platform 100 moves toward the main frame 200. As the load is disposed on the platform 100 in the raised position, the load begins to move the platform 100 against the resistance of the damping member 400 toward the support surface the main frame 200. The resistance of the damping member 400 progressively increases from a minimum value when the platform 100 is at the uppermost raised position to a maximum value when the platform 100 is positioned on the support surface of the main frame 200 to dampen the downward return of the platform 100 toward the main frame 200. The damping member 400 increasingly slows or decreases the rate at which the platform 100 moves from the raised position toward the main frame 200. The effect of the increasing resistance of the damping member 400 is to reduce any impact on the load as the load initially contacts the platform 100 and to reduce any impact on the load as the load bearing platform 100 comes to rest on the support surface of the main frame 200.

FIGS. 1 and 2 show the platform 100 comprised of a lower frame 130 having a plurality of longitudinal support members through which the fastening pin 120 extends to pivotally couple the first end of the platform 100 to the main frame 200, and one or more lateral support members appropriate for the particular load application. In the exemplary embodiment of FIGS. 1 and 2, a cover 140 is coupled to the lower frame 130 by a plurality of spring members 150 that bias the cover away from the lower frame 130. FIG. 2 shows a load sensor 160 coupled to the lower frame 130 for detecting the presence of a load on a support surface of the cover 140. The load initially moves the cover 140 against the bias of the spring members 150 toward the lower frame 130 to actuate the load sensor 160, which generates a detectable signal usable by an indicator or system controller. The support surface of the cover 140 may include one or more protruding ribs or cleats, which are particularly effective for engaging and preventing slippage of fibre bales disposed on the platform 100 in the raised position. Other load engaging or support structure may also be disposed on the load support surface, which may alternatively include one or more side walls useful for retaining certain types of loads on the platform 100. In the exemplary embodiment of FIG. 1, the second end of the main frame 200 has an overhanging portion, which permits the platform to be positioned over a loading dock D. The overhanging main frame portion may include a bumper and a downwardly adjustable stabilizing leg 240 with a lower foot 244, which prevents tipping of the main frame 200 when a load is disposed onto the platform 100.

Figure 3:
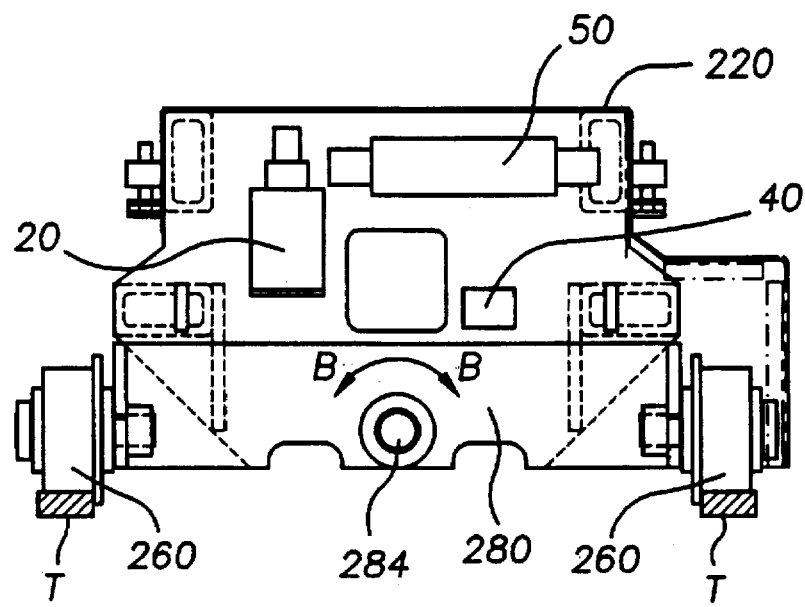
FIG. 3 is a partial front view of the exemplary embodiment of the invention as viewed from the left side of FIG. 1.

The apparatus of the exemplary embodiment is a translatable dolly having a first pair of wheels 250 coupled to the first end of the main frame 200, and a second pair of wheels 260 coupled to the second end of the main frame 200. The wheels 200 and are movable along a rail track T, or alternatively along any other suitable operating surface. An electric motor 270, which may be variable speed DC motor, is coupled to at least one of the wheels 250 and 260 to drive the apparatus along the operating surface. In the exemplary embodiment, the first pair of wheels 250 is connected by a common shaft or axle 252 coupled to the motor 270 by a reducer, which may be a right angle gear box 272. FIGS. 1, 2 and 3 show the second pair of wheels 260 rotatably coupled to opposite ends of a transverse member 280, which is pivotally coupled to a first bulkhead 290 of the main frame 200 by an interconnecting fastening member 284. FIG. 3 shows the transverse member 280 pivotal in the directions of arrows B about the fastening member 284, which compensates for variation in the operating surface or tracks. The pivoting transverse member 280 ensures that all four wheels 250 and 260 simultaneously contact the operating surface to distribute the weight of the load. Electric power may be supplied to the motor 270 through a power line housed in the umbilical cord 30, and is connectable to a power supply strip 50 on the main frame 200. Voltage transformers may be used to supply different voltage levels to the electrical components on the apparatus including the solenoid actuated air valve, load sensor 160 and electric motor 270. The apparatus may also include outer panels or a body, which covers and protects the wheels 250 and 260 and other internal components from the environment.

While the foregoing written description of the invention enables anyone skilled in the art to make and use what is at present considered to be the best mode of the invention, it will be appreciated and understood by those skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. Apparatus for transferring a load, comprising:
   a main frame;
   a load supporting platform pivotally coupled at one end thereof to said main frame so as to be movable between a first lowered position at which said load supporting platform is supportable by a support surface of said main frame, and a second position at which said load supporting platform is disposed at a raised and inclined position with respect to said support surface of said main frame;
   an actuating member, having a first end connected to said main frame at a first connection point of said main frame, and a second end connected to said load supporting platform at a first connection point of said load supporting platform, for raising said load supporting platform with respect to said main frame from said first lowered position to said second raised and inclined position; and
   a damping member having a first end connected to said main frame at a second connection point of said main frame, and a second end connected to said load supporting platform at a second connection point of said load supporting platform such that when said load supporting platform is pivotally lowered from said second raised and inclined position and toward said first lowered position so as to be supported upon said support surface of said main frame, said damping member increasingly dampens the movement of said load supporting platform as said load supporting platform moves from said second raised and inclined position and toward said first lowered position at which said load supporting platform is supported upon said support surface of said main frame so as to reduce any impact attendant contact of said load supporting platform upon said support surface of said main frame, when said load supporting platform is moved from said second raised and inclined position to said first lowered position, and as may be transmitted to said load supported upon said load supporting platform.

2. The apparatus of claim 1, wherein:
   said actuating member comprises an air cylinder.

3. The apparatus of claim 2, further comprising:
   a solenoid actuatable air valve for supplying air to said air cylinder so as to raise said load supporting platform from said first lowered position at which said load supporting platform is supported upon said support surface of said main frame to said second raised and inclined position, and for purging air from said air cylinder so as to permit said load supporting platform to move from said second raised and inclined position toward said support surface of said main frame.

4. The apparatus of claim 1, further comprising:
   a first pair of wheels mounted upon a first end of said main frame;
   a second pair of wheels mounted upon a second end of said main frame; and
   motor means operatively connected to at least on wheel of said first and second pair of wheels for rotatably driving the said at least one wheel.

5. The apparatus of claim 4, wherein:
   said main frame comprises a bulkhead, a transverse member pivotally mounted upon said bulkhead, and one of said first and second pairs of wheels is mounted upon said pivotable transverse member so as to permit contact of said wheels of said one of said first and second pairs of wheels upon uneven operating surfaces.

6. The apparatus as set forth in claim 1, further comprising:
   a second actuating member, having a first end connected to said main frame at a third connection point of said main frame, and a second end connected to said load supporting platform at a third connection point of said load supporting platform, disposed substantially parallel to and laterally spaced from said actuating member so as to operatively cooperate with said actuating member in pivotally moving said load supporting platform from said first lowered position to said second raised and inclined position.

7. The apparatus as set forth in claim 6, further comprising:
   a second damping member, having a first end connected to said main frame at a fourth connection point of said main frame, and a second end connected to said load supporting platform at a fourth connection point of said load supporting platform, disposed substantially parallel to and laterally spaced from said damping member so as to operatively cooperate with said damping member in damping the movement of said load supporting platform when said load supporting platform is moved from said second raised and inclined position to said first lowered position.

8. The apparatus of claim 1, wherein:
said damping member comprises a hydraulic cylinder.

9. The apparatus of claim 1, wherein:
said load supporting platform comprises a lower frame member; a load sensor mounted upon said lower frame member; a cover, having a load supporting surface movably mounted upon said lower frame member; and a plurality of spring means for connecting said cover to said lower frame member and for biasing said cover away from said lower frame member such that said cover is movable toward said lower frame member, against the biasing force of said spring means, so as to actuate said load sensor when a load is placed upon said load supporting surface of said cover.

10. The apparatus as set forth in claim 1, further comprising:
pivot pin means defining a pivotal connection of said one end of said load supporting platform to said main frame; and
said first connection point of said load supporting platform, at which said second end of said actuating member is connected to said load supporting platform, is located farther away from said pivot pin means than said second connection of said load supporting platform at which said second end of said damping member is connected to said load supporting platform such that said actuating member has increased leverage for moving said load supporting platform from said first lowered position to said second raised and inclined position.

11. A method for transferring a load onto a load supporting platform and moving said load supporting platform relative to a main frame upon which said load supporting platform is pivotally mounted, comprising the steps of:
activating an actuating member, having a first end connected to said main frame at a first connection point of said main frame, and a second end connected to said load supporting platform at a first connection point of said load supporting platform, so as to pivotally move said load supporting platform with respect to said main frame from a first lowered position, at which said load supporting platform is supported by a support surface of said main frame, to a second position at which said load supporting platform is disposed at a raised and inclined position with respect to said support surface of said main frame;
mounting a load upon said load supporting platform while said load supporting platform is disposed at said second raised and inclined position with respect to said support surface of said main frame;
activating a damping member, having a first end connected to said main frame at a second connection point of said main frame and a second end connected to said load supporting platform at a second connection point of said load supporting platform, so as to dampen the movement of said load supporting platform as said load supporting platform moves from said second raised and inclined position with respect to said support surface of said main frame and toward said first lowered position at which said load supporting platform will be supported up on said support surface of said main frame; and progressively increasing the damping resistance of said damping member as said load supporting platform moves from said second raised and inclined position with respect to said support surface of said main frame and toward said first lowered position with respect to said support surface of said main frame so as to reduce any impact attendant contact of said load supporting platform upon said support surface of said main frame, when said load support platform is moved from said second raised and inclined position to said first lowered position, and as may be transmitted to said load supported upon said load supporting platform.

12. The method of claim 11, further comprising the steps of:
providing said main frame with two pairs of wheels; and
driving at least one wheel of said two pairs of wheels by a motor so as to translate said main frame and said load supporting platform along an operating surface.

13. The method of claim 12, further comprising the step of:
mounting at least one pair of said two pairs of wheels upon a pivotable transverse member so as to permit simultaneous contact of said at least one pair of wheels upon uneven portions of said operating surface.

14. The method as set forth in claim 11, further comprising the steps of
providing a second actuating member, having a first end connected to said main frame at a third connection point of said main frame, and a second end connected to said load supporting platform at a third connection point of said load supporting platform, such that said second actuating member is disposed substantially parallel to and laterally spaced from said actuating member; and
simultaneously activating said actuating member and said second actuating member such that said actuating member and said second actuating member work together to pivotally move said load supporting platform from said first lowered position to said second raised and inclined position.

15. The method as set forth in claim 14, further comprising the steps of:
providing a second damping member, having a first end connected to said main frame at a fourth connection point of said main frame, and a second end connected to said load supporting platform at a fourth connection point of said load supporting platform, such that said second damping member is disposed substantially parallel to and laterally spaced from said damping member; and
simultaneously activating said damping member and said second damping member such that said damping member and said second damping member work together to dampen the movement of said load supporting platform when said load supporting platform is moved from said second raised and inclined position to said first lowered position.

16. The method of claim 11, further comprising the steps of:
providing said load supporting platform with a lower frame member;
mounting a load sensor upon said lower frame member; and
mounting a spring-biased cover, having a load supporting surface, upon said lower frame member such that when said load is mounted upon said load supporting surface of said spring-biased cover, said cover will be moved toward said lower frame member, against the biasing force of springs interposed between said spring-biased cover and said lower frame member, so as to actuate said load sensor and thereby indicate the presence of a load upon said load supporting surface of said spring-biased cover.

17. The method as set forth in claim 11, further comprising the step
providing said actuating member as an air cylinder.

18. The method as set forth in claim 11, further comprising the step of:
providing said damping member as a hydraulic cylinder.

* * * * *